Jan. 19, 1932.   J. LANZ   1,842,031
ELECTRIC MOTOR
Filed March 3, 1928
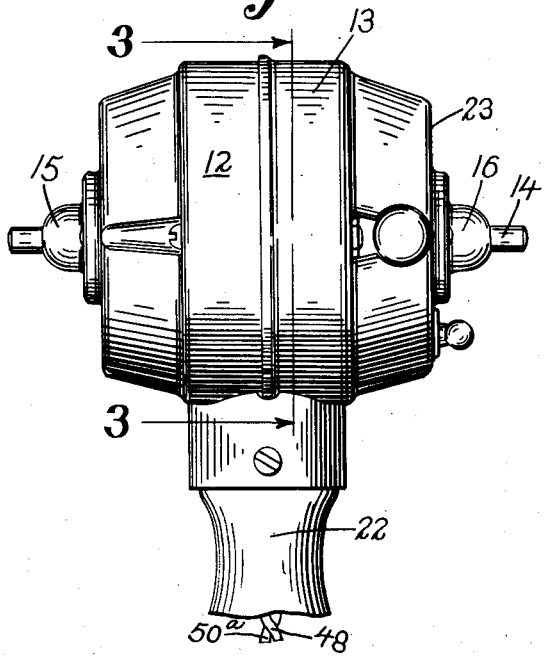
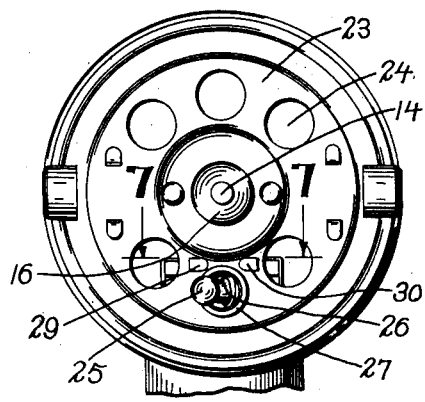
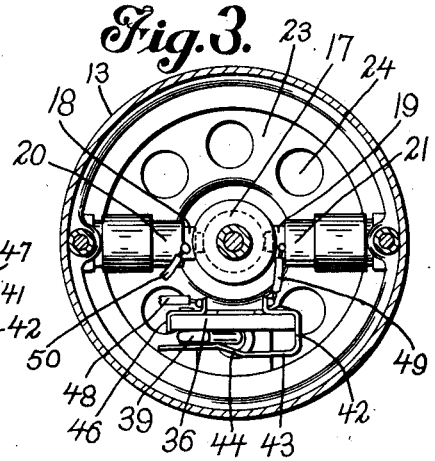
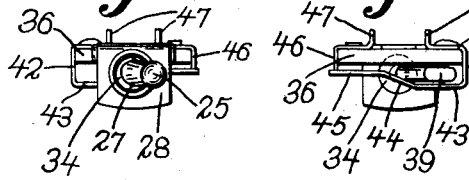
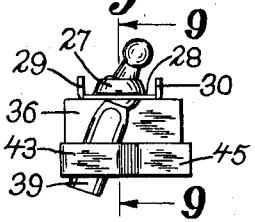
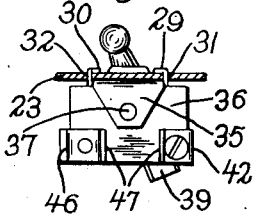
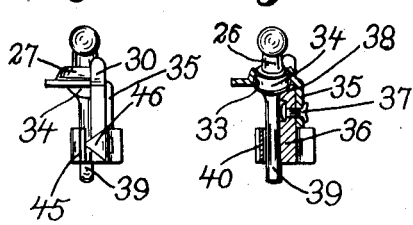
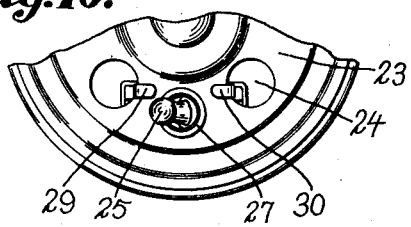
Inventor
John Lanz
By Rockwell & Bartholow
Attorneys Patented Jan. 19, 1932

1,842,031

UNITED STATES PATENT OFFICE

JOHN LANZ, OF NEW HAVEN, CONNECTICUT, ASSIGNOR, BY MESNE ASSIGNMENTS, TO THE A. C. GILBERT COMPANY, OF NEW HAVEN, CONNECTICUT, A CORPORATION OF MARYLAND

ELECTRIC MOTOR

Application filed March 3, 1928. Serial No. 258,926.

This invention relates to electric motors, and more particularly to a small electric motor of the portable type, having a switch mounted thereon for controlling the electrical energy supplied thereto.

One of the objects of this invention is to provide an electrical motor, having a casing, with an electrical switch so disposed upon the motor casing that it may be conveniently manipulated while the motor is desirably mounted upon a supporting member.

Another object of this invention is to provide an electrical motor with a controlling switch, which is economical to manufacture and which may be readily assembled to the casing of the motor.

A further object of this invention is to provide for application to and use with an electrical motor or other device, an improved and efficiently operable electrical switch.

A still further object of this invention is to provide an electrical switch structure, which is adapted to be readily applied to existing electrical motors or other devices, without affecting the efficiency of the same, by requiring a radical change in the structure thereof.

To these and other ends the invention consists in the novel features and combinations of parts to be hereinafter described and claimed.

In the accompanying drawings:

Fig. 1 is a side view of an electrical motor, embodying the features of my invention;

Fig. 2 is an end view of the same;

Fig. 3 is a section on line 3—3 of Fig. 1;

Fig. 4 is a front view of the electrical switch;

Fig. 5 is a rear view of the same;

Fig. 6 is an under-side view of the electrical switch;

Fig. 7 is a top view of the same;

Fig. 8 is an end elevation of the electrical switch;

Fig. 9 is a section on line 9—9 of Fig. 6, and

Fig. 10 is an end view of a motor having a switch of slightly modified form, applied thereto.

The electrical motor 12, which may be of any approved type, comprises a casing 13, generally cylindrical in shape, and a motor shaft 14 extending through the casing and journaled in bearings disposed in bearing retaining bosses 15 and 16. It would be understood, of course, that the shaft 14 is secured to the usual armature (not shown), and that the armature revolves between suitable field windings (not shown), constructed and arranged in the casing in the usual or any preferred manner. In this instance, a commutator 17 is provided, which is engaged by suitable brushes 18 and 19, disposed in suitable brush holders 20 and 21. As a support for the motor 12, a handle 22 is provided in this instance, but it will be understood that the handle 22 is illustrated primarily for the purpose of showing a suitable motor support which may be readily detached for the purpose of applying other desired supports to the motor.

The motor casing 13 is provided with end plate members 23, each of which is provided with ventilating openings 24, which preferably are circularly spaced apart thereabout. Protruding through one of these openings is a finger engaging portion 25 of an electrical switch operating member or lever 26, the switch in this instance, being disposed within the casing and secured against the inner face of one of the end members 23. The electrical switch is partially retained in position by the cooperation between a sleeve-like boss 27, struck up from a switch base plate 28, and one of the openings 24, through which the boss 27 protrudes. A pair of spaced apart fingers 29 and 30 formed integral with the plate 28, in this instance, is adapted to pass through spaced apart perforations 31 and 32 in the end member 23, and be turned over thereupon to clamp the plate 28 against the inner surface thereof. In the modified form shown in Fig. 10, these fingers are passed through the spaced apart openings 24, and turned over upon the end member surface for the same purpose.

The sleeve-like boss 27 is formed to provide a substantially hemispherical socket 33 (see Fig. 9), in which a substantially spherical portion 34 of the switch operating member 26 is seated and pivotally retained. A flange 35 extends from one edge of the plate 28 and substantially at right angles thereto in a direction opposite to the direction in which the boss 27 extends therefrom. A switch contact supporting member or base 36 is secured to the flange 35, by a rivet 37, and is disposed upon the inner surface thereof with an edge of the same substantially abutting the inner surface of the plate 28. A circular groove 38 is formed in this abutting edge of the member 36, and in which the spherical portion 34 is engaged and whereby it is retained within the socket 33.

A switch operating portion 39 extends from the portion 34 of the member 26, along the inner surface of the member 36, and is disposed between this member and a switch element or contact member 40. The element 40 is preferably formed of a strip of sheet spring metal, having one end 41 thereof secured to the outer surface of the member 36, and adjacent one end thereof. The element 40 then extends over and about this end of the member 36, as at 42, and along the inner surface of the same and slightly beyond the other end thereof. A portion 43 of that part of the element 40, which extends along the inner surface of the member 36, is spaced above and substantially parallel to this surface, so as to clear the switch operating member portion 39. The element 40 is then extended toward the surface of the member 36, by bending the same to form a portion 44, disposed at an obtuse angle to the adjacent portion. The remaining portion 45 continues substantially parallel to the inner surface of member 36 and due to the resiliency of the material of which element 40 is made, is urged toward this surface and into engagement with another switch contact element 46.

The element 46 is formed of a short strip of sheet metal, and is secured upon the outer surface of the member 36, adjacent the end thereof, opposite to the end upon which the element 40 is secured. The element or contact 46 is turned over the end of the member 36 and is extended slightly beyond the inner surface of this member, so as to be disposed in under the portion 45, whereby it may be engaged thereby.

Both of the elements 40 and 46, in this instance, are provided with wire or lead connecting lugs 47 to which motor operating wires or leads 48 and 49 may be soldered or otherwise electrically connected. As illustrated in the drawings, the lead 48 is electrically connected to the lug 47, provided on element 46, and the lead wire 49 is connected to the lug 47 provided on the element 40. The motor illustrated being a series wound one the lead 49 is also connected to the brush 19, and the lead 48 will continue without the motor casing in any suitable manner, such as through the handle 22 or other support, as shown in Fig. 1, and be connected to a suitable source of electrical energy. A lead 50 electrically connected to the brush 18, leads to one terminal of the field winding, the other terminal of which is connected to a lead 50$^a$ that is likewise continued without the motor casing, so that it also may be connected to the source of electrical energy.

The switch elements 40 and 46, due to the above wiring arrangement, are in series with the motor circuit, and therefore, when they are permitted to contact, this circuit will be closed to operate the motor, and when they are separated or retained out of contact, the circuit will be opened, whereby the operation of the motor will be prevented. The operations of opening and permitting the closing of the motor circuit, are controlled by manipulation of the swingable switch operating member 26. By swinging the member 26, so as to dispose the portion 39 thereof between the portion 45 of element 40, and the inner surface of member 36, as shown in Fig. 3, the motor circuit is opened, elements 40 and 46 being separated and held out of contact. To operate the motor, the member 26 is swung so as to dispose the portion 39 thereof between the portion 43 of element 40 and the member 36, as shown in Fig. 5, whereby the elements 40 and 46 are permitted to contact and thereby close the motor circuit.

The above motor control operations are readily performed, due to the accessibility of the finger engaging portion 25 of the switch operating member or lever 26, this portion being disposed, in this instance, adjacent the lower edge of the motor casing and within reach of the operator's thumb of the hand grasping the handle 22. The operation of the finger engaging portion merely requires a laterally directed movement to press it in either lateral direction, to cause the desired swinging movement of the lever 26. By the provision of a switch of the above structure, an electrical device, such as a motor of the type described, may be readily equipped with an efficient control means, either if, as shown in Fig. 10, it is a motor previously in use or before it is completely manufactured and offered to the market. This advantage is principally due to the provision in the switch structure of the novel features, as pointed out above, including the switch attaching means by the use of which openings previously formed in the end plate of the motor casing, or which may be readily formed therein, are used to receive the securing means and to receive certain switch parts and permit operable accessibility thereto.

While I have shown and described a preferred embodiment of and use for my invention, by combining a novel or improved switch structure, to a part of the casing of an electrical motor or like device, it will be understood that I do not limit myself to this specific embodiment and use thereof, nor to all of the details shown, as many variations and modifications are possible, which will lie within the spirit of the invention and the scope of the appended claims.

What I claim is:

1. In an electric motor, a casing, end plate members at each end of said casing, one of said members having an opening therein, and a motor controlling switch secured to said end plate member with a sleeve-like part thereof protruding through the opening in said member and a switch lever in said sleeve-like part and extending outwardly therefrom.

2. In an electric motor, a casing, end plate members at each end of said casing, one of said members having spaced apart openings therein, a motor controlling switch having a part thereof protruding through one of the openings in said plate member to retain said switch against movement relatively thereto, an operating part of said switch being journaled in said part and extending therefrom, and means passing through another opening in said plate member to secure said switch thereto.

3. In combination with an electrical device having a circular plate member in its structure wherein a series of spaced apart openings are provided and disposed about and spaced from its center, a control switch for said device including means on said switch disposed within one of the openings in said plate member to engage the same and dispose said switch relatively thereto.

4. In an electrical device having a plate member, a switch therefor having a base plate, means on said base plate to secure it to said plate member, a sleeve-like boss having an interiorly formed socket forming part of said means, an electrical contact member secured to said base plate, another contact member secured to said base plate and being adapted to engage and be disengaged from said first mentioned contact member, and a switch operating member swingable into contact disengaging position and into position to permit said contact members to engage, a portion of said switch operating member being disposed in said interiorly formed socket to pivot therein.

5. In combination with an electrical device having a portion provided with an opening leading to the exterior of said electrical device, a control switch comprising a base plate, means on said base plate to secure it at the interior of said device to said portion thereof, an electrical contact member secured to said base plate, another contact member secured to said base plate and being adapted to engage and be disengaged from said first mentioned contact member, and a switch operating member swingable into contact disengaging position and into position to permit said contact members to engage, and having an operating part extending outwardly through the opening in said portion of said device.

6. In combination with an electrical device having a portion provided with an opening leading to the exterior of said electrical device, a control switch comprising a base plate, means on said base plate to secure it at the interior of said device to said portion thereof, a boss formed on said base and having an interiorly formed socket, said boss forming part of said securing means, an electrical contact member secured to said base plate, another contact member secured to said base plate and being adapted to be engaged and disengaged from said first mentioned contact member, and a switch operating member swingable into contact disengaging position and into position to permit said contact members to engage, said switch operating member having a part adapted to be received in said socket to pivot therein, and having an operating part extending outwardly through the opening in said portion of said device.

7. In combination with an electrical device having a portion provided with an opening leading to the exterior of said electrical device, a control switch comprising a base plate, means on said base plate to secure it at the interior of said device to said portion thereof, a boss formed on said base and having an interiorly formed socket, said boss forming part of said securing means, an electrical contact member secured to said base plate, a resilient contact member secured to said base plate and being adapted to move toward the other to engage the same and to be moved away from the other to be disengaged therefrom, and a switch operating member, swingable to move said contacts into disengaged position and to permit said contact members to move toward each other to engage, said switch operating member having a part adapted to be received in said socket to pivot therein and to extend outwardly through the opening in said device, an edge of said base plate overlying the mouth of said socket to retain said switch operating member part therein.

8. In combination, an electrical device having a circular plate member in its structure and including electrically operated means, said plate member being provided with a series of spaced apart openings disposed about and spaced from its center, a control switch for said electrically operated means, including means on said switch to pass through one of the openings in said plate member to engage the same and dispose said switch relatively thereto upon the inner surface thereof, switch operating means extending through said plate engaging means, and means extending from said plate member engaging means and extending through another of the openings in said plate member to secure said switch thereto.

9. In combination with an electrical device having a member provided with openings leading to the exterior of said device, a control switch having a base plate, means on said base plate to secure it to the interior of said device upon said member, including a part secured to said base plate and having portions extending through adjacent openings in said member, and a switch operating member for operating said switch, said switch operating member pivoted to said part and extending outwardly through one of the portions thereof to the exterior of said device.

10. In an electrical device having a casing enclosing electrically operable means, said casing having openings leading to the exterior thereof, a switch within said casing for controlling the enclosed electrically operable means, said switch having a part in the form of a socket, said socket formed part extending through one of the openings in said casing, a switch operating part pivoted in said socket formed part and extending without said casing, and means extending from said socket formed part through another of the openings in said casing to secure said switch thereto.

In witness whereof, I have hereunto set my hand this 1st day of March, 1928.

JOHN LANZ.